United States Patent
Engler et al.

(10) Patent No.: US 11,851,203 B2
(45) Date of Patent: Dec. 26, 2023

(54) WASTE HEAT TRANSFER SYSTEM FOR AIRCRAFT FUEL CELL

(71) Applicant: Wright Electric, Inc., Ballston Spa, NY (US)

(72) Inventors: Jeffrey M. Engler, Ballston Spa, NY (US); Colin Tschida, Ballston Spa, NY (US); Kok Long Ng, Windsor (CA); Deven Warke, Santa Clara, CA (US)

(73) Assignee: Wright Electric, Inc., Ballston Spa, NY (US)

( * ) Notice: Subject to any disclaimer, the term of this patent is extended or adjusted under 35 U.S.C. 154(b) by 0 days.

(21) Appl. No.: 17/974,510

(22) Filed: Oct. 26, 2022

(65) Prior Publication Data
US 2023/0132092 A1   Apr. 27, 2023

Related U.S. Application Data

(60) Provisional application No. 63/272,031, filed on Oct. 26, 2021.

(51) Int. Cl.
| | |
|---|---|
| *B64D 33/10* | (2006.01) |
| *B64D 27/24* | (2006.01) |
| *B60L 58/30* | (2019.01) |
| *H01M 12/06* | (2006.01) |
| *H01M 8/04701* | (2016.01) |
| *H01M 8/04029* | (2016.01) |
| *H01M 8/083* | (2016.01) |

(52) U.S. Cl.
CPC .............. *B64D 33/10* (2013.01); *B60L 58/30* (2019.02); *B64D 27/24* (2013.01); *H01M 8/04029* (2013.01); *H01M 8/04738* (2013.01); *H01M 8/083* (2013.01); *H01M 12/065* (2013.01); *B60L 2200/10* (2013.01); *H01M 2250/20* (2013.01)

(58) Field of Classification Search
CPC ......... B64D 27/24; B64D 33/10; B60L 58/30; B60L 2200/10; H01M 8/04029; H01M 8/04738; H01M 8/083; H01M 12/065; H01M 2250/20
USPC ......................................................... 244/57
See application file for complete search history.

(56) References Cited

U.S. PATENT DOCUMENTS

| | | | |
|---|---|---|---|
| 2008/0001026 A1 | 1/2008 | Hoffjann et al. | |
| 2009/0263680 A1 | 10/2009 | Mata et al. | |
| 2014/0298824 A1 | 10/2014 | Truemper et al. | |
| 2017/0267109 A1 | 9/2017 | Graefenstein et al. | |
| 2020/0398992 A1 | 12/2020 | Morrison | |
| 2022/0238897 A1* | 7/2022 | Hellmann | H01M 8/04014 |

OTHER PUBLICATIONS

International Search Report and Written Opinion based on PCT/US2022/047948 dated Feb. 21, 2023 (7 pages).

* cited by examiner

*Primary Examiner* — Brady W Frazier
(74) *Attorney, Agent, or Firm* — Nutter McClennen & Fish LLP

(57) ABSTRACT

An aircraft has an aircraft propulsor and/or an aircraft propulsor drive. The aircraft propulsor and/or an aircraft propulsor drive acts as a waste heat source. The aircraft has a metal-air fuel cell. The aircraft has a waste heat transfer system configured to thermally couple the metal-air fuel cell and a waste heat source. The aircraft includes a control system configured to operate the waste heat transfer system to selectively transfer waste heat from the waste heat source to the metal-air fuel cell.

20 Claims, 6 Drawing Sheets

WASTE HEAT TRANSFER SYSTEM FOR AIRCRAFT FUEL CELL

PRIORITY

This patent application claims priority from provisional U.S. patent application No. 63/272,031, filed Oct. 26, 2021, entitled, "ENERGY STORAGE," and naming Jeffrey Engler and Arthur Dobley as inventors, the disclosure of which is incorporated herein, in its entirety, by reference.

FIELD

Illustrative embodiments of the invention generally relate to energy storage and, more particularly, various embodiments of the invention relate to energy storage for an aircraft.

BACKGROUND

Electric-propelled aircraft are powered by onboard energy storage. The addition of onboard energy storage increases weight to the aircraft, and thus decreases the useful load of the aircraft. Furthermore, certain types of energy storage, such as fuel cells, may increase in weight as they are expended.

SUMMARY OF VARIOUS EMBODIMENTS

In accordance with one of the embodiments of the invention, an aircraft has an aircraft propulsor and/or an aircraft propulsor drive. The aircraft propulsor and/or an aircraft propulsor drive acts as a waste heat source. The aircraft has a metal-air fuel cell and a waste heat transfer system to thermally couple the metal-air fuel cell and a waste heat source. The aircraft also has a control system to operate the waste heat transfer system to selectively transfer waste heat from the waste heat source to the metal-air fuel cell.

In some embodiments, the aircraft has an air supply system to pressurize an air supply for the metal-air fuel cell.

In some embodiments, the aircraft has a plurality of metal-air fuel cells including the metal-air fuel cell and the waste heat transfer system includes a diverter system to selectively transfer heat from the waste heat source to a portion of the plurality of metal-air fuel cells.

The control system may determine a power output status of a first metal-air fuel cell of the plurality of metal-air fuel cells, and operate the diverter system to transfer waste heat from the waste heat source to the first metal-air fuel cell in response to determining the power output status. The waste heat may then evaporate an electrolyte of the first metal-air fuel cell.

The control system may determine at least one of a power output status or a temperature of one of the plurality of metal-air fuel cells, and operate the diverter system to transfer heat from the waste heat source to a first metal-air fuel cell in response to determining the at least one of the power output status or the temperature.

The control system may determine a take-off event is occurring and operate a diverter system to transfer heat from the waste heat source to the metal-air fuel cell in response to determining the take-off event is occurring.

In some embodiments, the waste heat transfer system includes a liquid-to-liquid heat exchanger, a liquid-to-air heat exchanger, and a diverter system, and the metal-air fuel cell is an aluminum-air fuel cell.

In accordance with another embodiment of the invention, a method for heating a metal-air fuel cell includes operating an aircraft including a waste heat source and a metal-air fuel cell. The method then outputs power from the metal-air fuel cell. The method then generates thrust and waste heat using the waste heat source. The method then transfers the waste heat to the metal-air fuel cell.

In some embodiments, the method pressurizes an air supply and provides the pressurized air supply to the metal-air fuel cell.

In some embodiments, the method determines at least one of a power output status or a temperature. Transferring the waste heat to the metal-air fuel cell may be in response to determining the at least one of the power output status or the temperature.

The aircraft may include a second metal-air fuel cell. In some embodiments, the method determines a power output status of the second metal-air fuel cell and transfers at least a portion of the waste heat to the second metal-air fuel cell.

The method may determine a power output status of the metal-air fuel cell and evaporate an electrolyte using the waste heat of the metal-air fuel cell.

In accordance with yet another embodiment of the invention, an aircraft includes an aircraft propulsor and/or an aircraft propulsor drive, the aircraft propulsor and/or an aircraft propulsor drive acting as a waste heat source. The aircraft includes two metal-air fuel cells to provide power to the aircraft propulsor drive. The aircraft includes a waste heat transfer system to thermally couple the first and second metal-air fuel cells and a waste heat source. The aircraft also includes a control system to operate the waste heat transfer system to selectively transfer waste heat to the first metal-air fuel cell and the second metal-air fuel cell.

The first and second metal-air fuel cells may be aluminum-air fuel cells.

In some embodiments, the waste heat transfer system includes a heater exchanger and a diverter system including a plurality of valves, wherein the control system is to operate the plurality of valves to selectively transfer the waste heat to the first metal-air fuel cell, and then to the second metal-air fuel cell.

The control system may determine a power output status for the first metal-air fuel cell and evaporate an electrolyte of the first metal-air fuel cell in response to the power output status.

The aircraft may include an air supply system to pressurize an air supply for the first and second metal-air fuel cell.

The control system may determine a take-off event is occurring and operate a diverter system of the waste heat transfer system to transfer heat from the waste heat source to the first metal-air fuel cell in response to determining the take-off event is occurring.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an aircraft is propelled by electric propulsors powered by metal-air fuel cells. The fuel cells may be supplied with pressurized oxygen and/or waste heat derived from an onboard heat source to increase the power density of the cells. Details of illustrative embodiments are discussed below.

Figure 1:
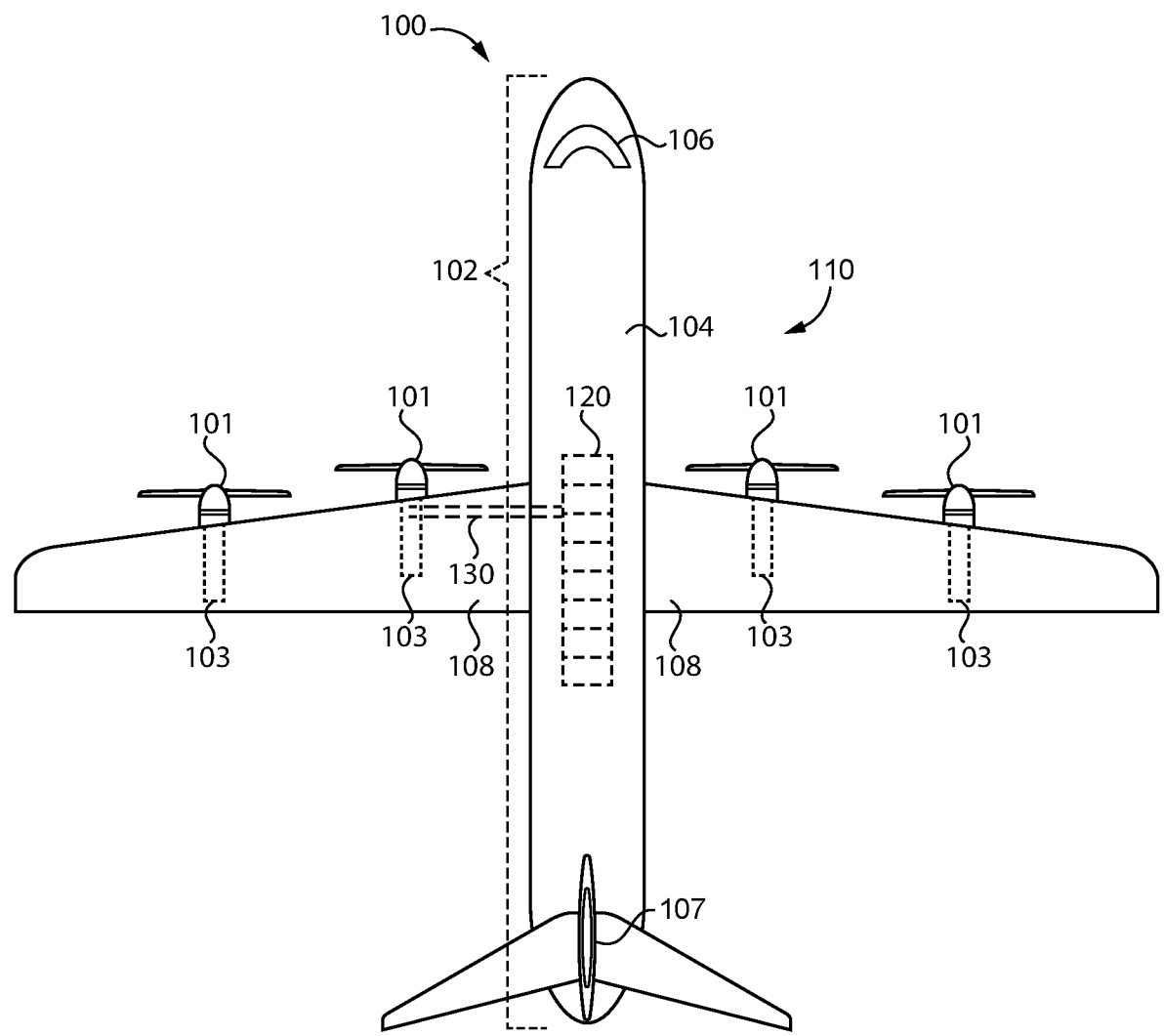
FIG. 1 schematically shows an aircraft having an exemplary energy storage in accordance with various embodiments.

FIG. 1 schematically shows an aircraft 100 in accordance with various embodiments. Among other things, the aircraft 100 may be able to carry 90-150 passengers on flights at jet altitudes and speeds over distances of at least 600 miles.

The aircraft 100 may have a fuselage 102, which may house a pressurized passenger area 106 configured to house passengers and provide pressurized air to passengers. The fuselage 102 may further house an unpressurized area 104 for storing cargo. The aircraft 100 may have one or more sets of wings 108 configured to provide suitable lift for flight, takeoff, and landing.

The aircraft 100 has an energy storage 110 configured to store and provide power to propulsor drives 103 configured to invert power from the energy storage 110. The propulsor drive 103 provides the inverted power to the electric propulsors 101 configured to generate thrust. Among other things, the propulsor 101 may have a power rating of at least 2 MW. The propulsors 101 may be coupled to the wings 108, the tail 107, or the fuselage 102.

A byproduct of generating thrust using electric power is heat, also known as waste heat. Each propulsor 101 and propulsor drive 103 is a waste heat source. Energy storage 110 is configured to use the waste heat from a propulsor 101 or propulsor drive 103 as a waste heat source, to increase the output power capabilities of the energy storage 110. While waste heat sources are located on the wing in the illustrated aircraft 100, some waste heat sources, such as propulsor drives, may be relocated into the fuselage in some embodiments.

The energy storage 110 has aluminum-air fuel cells 120 configured to store and output power. The aluminum-air fuel cells 120 may be aggregated into fuel cell packs secured in the aircraft 100, such as in the pressurized area 106 or the unpressurized area 104. The aluminum air-fuel cells 120 may be located in the cargo hold of the unpressurized area. Since an aluminum fuel cell is a primary cell, the fuel cells packs, the aluminum-air fuel cells 120, or at least the aluminum within the fuel cells 120, is removable and may be replaced when expended. It should be appreciated that the number of illustrated aluminum air fuel cells is not intended as a limitation. In some embodiments, the aircraft may include more or fewer aluminum air fuel cells 120. In some embodiments, the aluminum-air fuel cell may instead be another metal-air fuel cell, such as zinc, among other things.

The energy storage 110 has a waste heat transfer system 130 configured to thermally couple at least one waste heat source to the aluminum-air fuel cells 120. The waste heat generated by the waste heat source may be selectively provided to the aluminum-air fuel cell 120 to change certain characteristics, such as increasing power density and decreasing weight.

Figure 2:
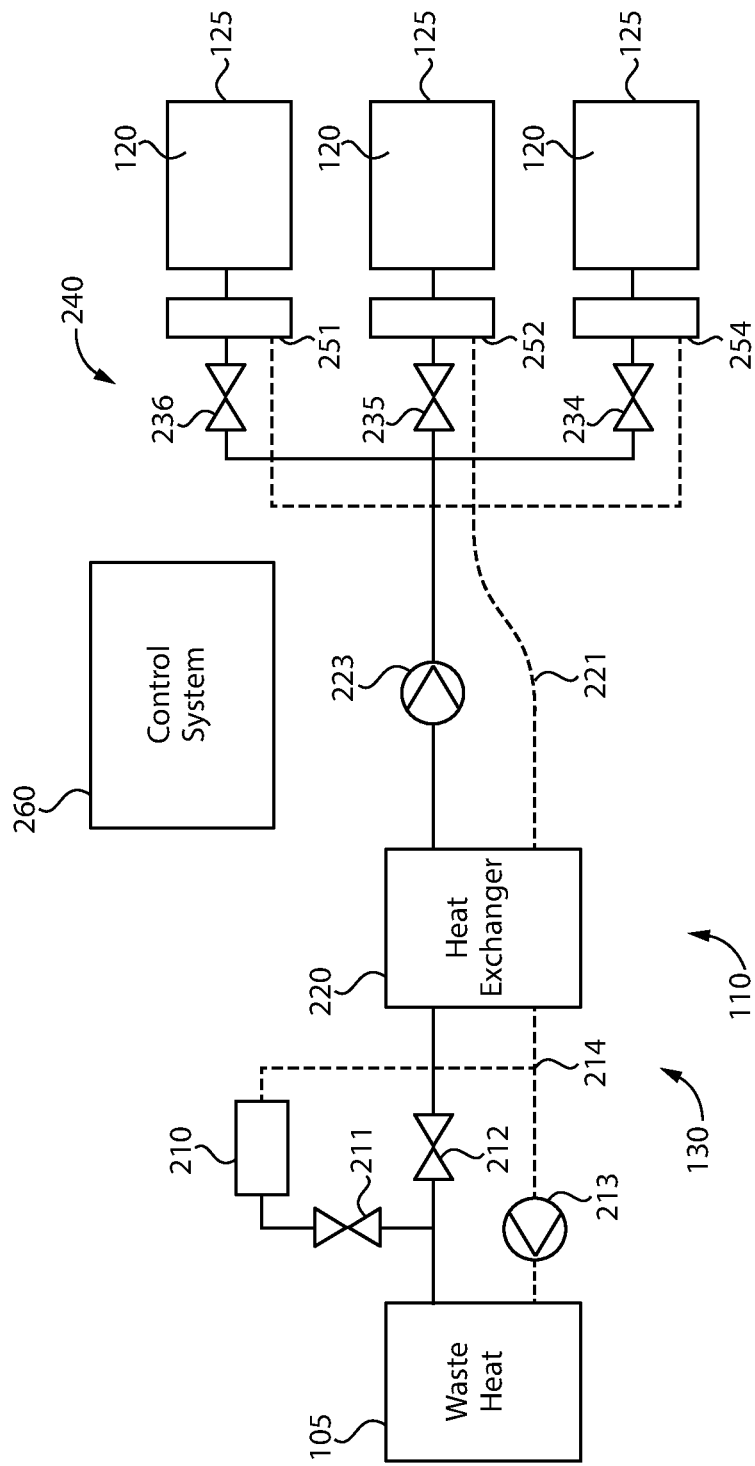
FIG. 2 schematically shows an energy storage in accordance with various embodiments.

FIG. 2 schematically shows the energy storage 110 configured to receive heat from a waste heat source 105 in accordance with various embodiments. In the illustrated embodiment, the energy storage 110 has fuel cell packs 125 comprising the aluminum-air fuel cells 120. Among other things, each fuel cell pack 125 may include 50-100 aluminum-air fuel cells 120. In some embodiments, the heat transfer system 130 may selectively provide heat to individual aluminum-air fuel cell 120 rather than selectively providing heat to aluminum-air fuel cells 120 of one of the fuel cell packs 125.

It should be appreciated that the topology of energy storage 110 is illustrated for the purpose of explanation and is not intended as a limitation of the present disclosure. For example, the energy storage may include more or fewer heat exchangers, more or fewer valves, more or fewer pumps, or a rearrangement of any of the illustrated components.

The energy storage 110 includes circulating lines 214 configured to circulate a liquid through the waste heat source 105, valves 211 and 212, liquid-to-heat exchanger 210, heat exchanger 220, and pump 213. The liquid circulated through the circulating lines 214 is configured to absorb waste heat from the waste heat source 105, and transfer the waste heat to heat exchanger 210 or the heat exchanger 220, depending on the configuration of the valves 211 and 212. The valves 211 and 212 may be opened, closed, or partially opened. The pump 213 is configured to circulate the liquid through the circulating lines 214. The liquid-to-air heat exchanger 210 is configured to disperse excess heat that is not needed or cannot be used by the energy aluminum-air fuel cell 120. In some embodiments, the control system 260 controls the valves 211 and 212 based on a temperature of the aluminum-air fuel cells 120. In some embodiments, the control system 260 partially opens the valves 211 and 212 to simultaneously transfer heat to the fuel cells 120 and disperse excess heat.

The heat exchanger 220 is configured to transfer heat between the liquid in circulating lines 214 and the liquid in circulating lines 221. The circulating lines 2201 are configured to circulate a liquid through pump 223; valves 234, 235, and 236; and heat exchangers 251, 253, and 254, depending on the configuration of the valves 234, 235, and 236. By opening, closing, or partially opening one or more of the valves 234, 235, and 236, the control system 260 can select which heat exchanger the liquid circulates through, and thereby selects which of the aluminum-air fuel cells receives the waste heat. By having the circulating lines 221, the liquid in the circulating lines (i.e., oil) does not circulate in the same heat exchanger as the electrolyte circulating in the cell packs 125, and may also reduce the amount of electrolyte and oil needed for the waste heat transfer system 130.

The diverter system 240 system of the energy storage 110 is comprised of controllable devices configured to allow or block the flow of liquid through circulating lines. In the illustrated example, the diverter system 240 includes valves 211, 212, 234, 235, and 236. In this way, the diverter system 240 is configured to selectively transfer waste heat from the waste heat source 105 to one or more of the aluminum-air fuel cells 120 or cell packs 125 at one time. In some embodiments, the fuel cell packs are located on racks that integrate the heat exchangers 251, 253, and 254, or valves 234, 235, and 236, or a combination thereof.

The power density of metal-air fuel cell is dependent in part on the temperature of the fuel cell. The power density of the fuel cell generally increases as the temperature of the fuel cell increases, up to the boiling point of the electrolyte. The control system 260 is configured to operate the diverter system 120 to heat an aluminum-air fuel cell 120 outputting power or preparing to output power to maximize the power density of the fuel cell 120. The control system 260 monitors the temperature of the fuel cell 120 to avoid the boiling point of the electrolyte. Since the aircraft 100 climbs to high altitudes, the boiling point of the electrolyte may be affected by the reduce atmospheric pressure. Therefore, the control system 260 is configured to determine the fuselage pressure where the fuel cells 120 are located in the fuselage (e.g. using a barometric sensor) and adjust the waste heat provided to the fuel cell 120 to not exceed the changing boiling point. For example, as the aircraft 100 flies higher, temperature threshold of the fuel cell must be lowered to account for the lowering boiling point of the electrolyte. In some embodiments, the control system 260 determines the fuel cell temperatures using sensors configured to measure the electrolyte temperature, among other things. If the waste heat source produces too much waste heat, the control system disperses the excess heat external to the aircraft 100 using heat exchanger 210. The control system 260 may determine to transfer heat to one or more of the fuel cells based on the temperature of the battery, the state of charge of the fuel cell, or the amount of heat being generated by the aircraft 100, all of which may be measured by various sensors and other measuring devices.

Once the fuel cell 120 is expended and no longer capable of providing power, the control system 260 may then apply heat so that the electrolyte exceeds the boiling point and evaporates, thereby reducing the weight of the fuel cells 120.

Figure 3:
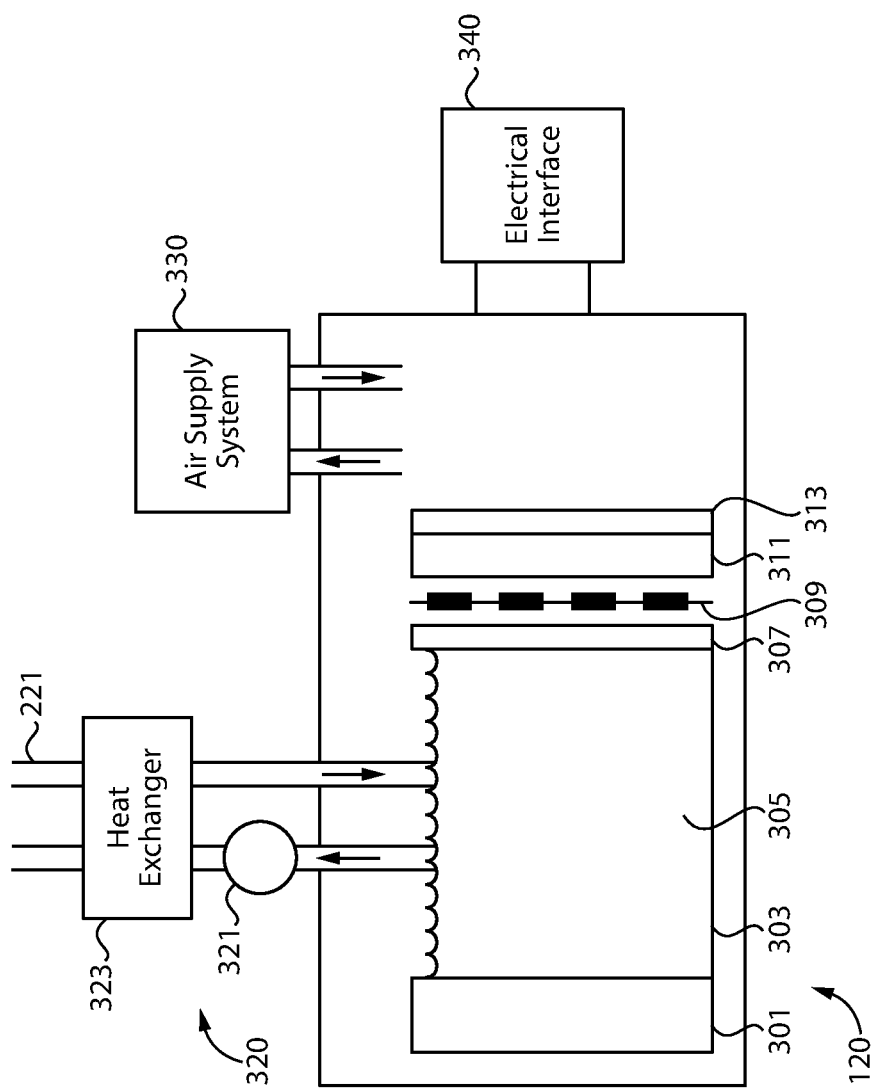
FIG. 3 schematically shows a metal-air fuel cell in accordance with various embodiments.

FIG. 3 schematically shows the aluminum-air fuel cell 120 in accordance with various embodiments. The aluminum-air fuel cell 120 generates power through a chemical reaction between aluminum and oxygen. To that end, the aluminum-air fuel cell 120 of FIG. 3 includes an aluminum anode 301 and a cathode 311 separated by an electrolyte chamber 303 filled with an electrolyte 305. The aluminum anode 121 may be comprised of aluminum or an aluminum alloy. Among other things, the aluminum anode 121 may be comprised of an aluminum-magnesium alloy or an aluminum magnesium-tin allow.

The electrolyte 123 may be comprised of an alkaline material and a solvent. For example, the electrolyte 123 may be comprised of potassium hydroxide (KOH) and water, among other things. When the electrolyte 305 is evaporated by the waste heat, the solvent evaporates while the alkaline material may not. The electrolyte circulator 320 circulates the electrolyte 305 in the electrolyte chamber 303 and may heat the electrolyte when passed through the heat exchanger of the electrolyte circulator 320.

The fuel cell 120 includes a separator 307 configured to allow air into the electrolyte chamber 303 while preventing the electrolyte from escaping from the electrolyte chamber 303.

The fuel cell 120 includes a current collector, such as a nickel mesh. The fuel cell 120 also includes a cathode 311 including carbon and a catalyst. The carbon may support the catalysts and the catalysts may include, platinum, or manganese dioxide, among other things.

The energy storage 110 also has fuel cell support systems configured to assist the aluminum-air fuel cell 120 with outputting power. To that end, the fuel cell support systems include an air supply system 330 configured to provide oxygen to the fuel cell 120. In certain embodiments, the air supply system 330 includes an air compressor that pressurizes the air before providing the air to the aluminum-air fuel cell 120. At high altitudes, the oxygen content of the air decreases. By pressurizing the air, the air compressor increases the oxygen provided to the aluminum-air fuel cell 120.

The fuel cell support systems also include an electrical interface 340 configured to receive power output by the aluminum-air fuel cell 120. The fuel cell support systems 140 further include an electrolyte circulator 320, configured to circulate the electrolyte of the aluminum-air fuel cell 120. The electrolyte circulator 143 may include a pump 321 and a heat exchanger 323.

The aluminum-air fuel cells 120 have a maximum power rating and an energy storage rating determined by the aluminum anode 301. Specifically, the more aluminum anode mass in the fuel cell 120, the higher the energy storage rating. The greater the surface area of the aluminum anode 121 in the fuel cell 120, the higher the maximum power rating.

In some embodiments, the aircraft 100 includes fuel cells having different configurations of the aluminum anode 121 to satisfy both energy and power requirements. These configurations may be referred to as energy cell configuration and power cell configuration.

In the energy cell configuration, the aluminum anode 301 may be a block of solid material. By contrast, in the power cell configuration, the aluminum anode 301 may be comprised of an aluminum foam to increase the surface area while maintaining similar outer dimensions to the block used in the energy cell configuration. In some embodiments where the power cell configuration and the energy cell configuration have equal outer dimensions, the mass of aluminum in the power cell configuration may be less than half the mass of the aluminum in the energy cell configuration, to name but one example. By using a foam instead of a solid material, the maximum output power for the power cell configuration may be at least 3 times the maximum output power where a block of similar dimensions is used.

Unlike other applications of fuel cells, the flights of the aircraft 100 will have a similar power curve: a maximum power demand as the aircraft 100 ascends to cruising altitude, a reduced power demand as the aircraft 100 travels at cruising speed, and a further reduced power demand as the aircraft 100 descends and lands. When the aircraft 100 includes fuel cells with both energy cell configuration and power cell configurations, the control system 260 may advantageously use the power cell configuration fuel cells to achieve the maximum power output required during take-off, thereby avoiding the need for the aircraft 100 to carry additional fuel cells not needed to meet an energy storage capability in order to achieve the maximum power output required for take-off.

Figure 4:
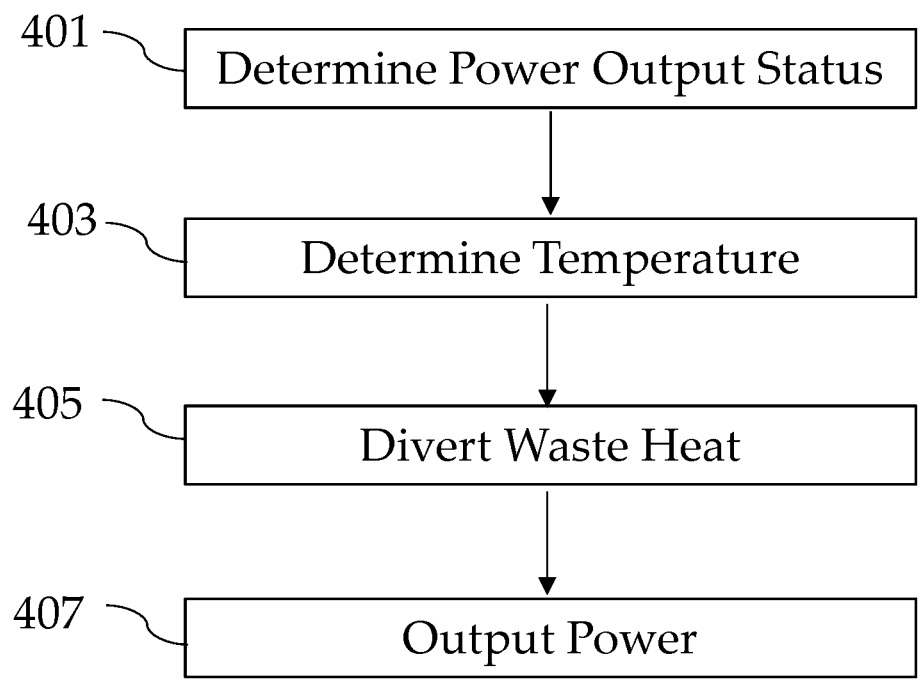
FIG. 4 shows a process for diverting waste heat in according to various embodiments.

FIG. 4 shows an exemplary process 400 for diverting waste heat of the aircraft having the energy storage 110 including more than one fuel cell in accordance with various embodiments. A number of variations or modifications to Process 400 are contemplated including, for example, the omission of one or more aspects of Process 400, the addition of further conditionals and operations, or the reorganization or separation of operations and conditionals into separate processes.

Process 400 begins at operation 401 where the control system 260 determines the power output status of one of the aluminum-air fuel cells 120. Power output status may include, among other things, a voltage of output power, a current of output power, a received command to begin/stop outputting power from a fuel cell, or a state of charge of the fuel cell. For example, the control system 260 may determine that one of the aluminum-air fuel cells 120 is expended, or the control system 260 may determine that one of the aluminum-air fuel cells 120 has begun outputting power to the aircraft 100. Determining the power output status may include determining a change in the power output status. Where the power output status indicates a change of the fuel cell supplying power to the aircraft 100, Process 400 will proceed to operation 403 to begin providing waste heat to the new aluminum-air fuel cell, and decrease or terminate providing waste heat to the previous aluminum-air fuel cell 120.

During operation 403, the control system 260 determines a prescribed temperature for the aluminum-air fuel cell 120. The prescribed temperature may be the temperature that increases or maximizes the power density of the aluminum-air fuel cell 120, among other things.

The control system 260 begins to heat the new aluminum-air fuel-cell 120 in operation 405 by operating the diverter system 240 to divert the waste heat, at least in part, to the new aluminum-air fuel-cell 120.

In operation 407, the heated aluminum-air fuel-cell 120 provides output power to the propulsors of the aircraft 100. The increased temperature of the aluminum-air fuel-cell 120 increases the power density of the aluminum-air fuel cell 120.

It should be appreciated that Process 400 may be repeated each time the control system 260 selects a new fuel cell 120 to provide power after the previous fuel cell has been expended.

Figure 5:
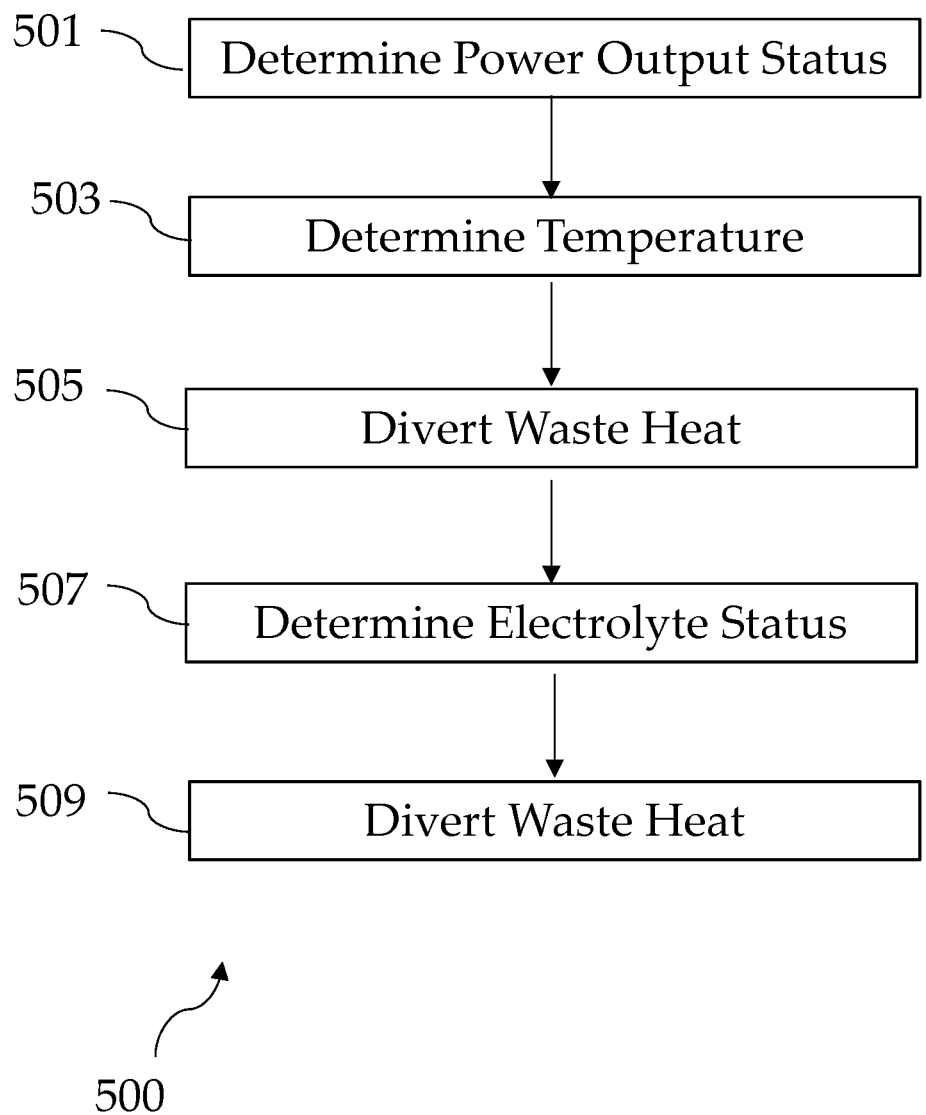
FIG. 5 shows a process for reducing aircraft weight in accordance with various embodiments.

FIG. 5 shows an exemplary process 500 for reducing aircraft weight during flight in accordance with various embodiments. A number of variations or modifications to Process 500 are contemplated including, for example, the omission of one or more aspects of Process 500, the addition of further conditionals and operations, or the reorganization or separation of operations and conditionals into separate processes.

Process 500 begins at operation 501 where the control system 260 determines that a power output status for the aluminum-air fuel-cell 120 indicates the fuel-cell has been expended. In order to continue to provide power to the aircraft 100, the control system 260 selects a new aluminum-air fuel cell 120 to output power. In operation 503, the control system 260 determines a prescribed temperature for the expended aluminum-air fuel-cell 120 based on the inflight boiling point of the electrolyte 305. The control system 260 diverts the waste heat to the expended aluminum-air fuel-cell 120 to heat the fuel cell 120, causing the solvent of the electrolyte to begin evaporating. The control system 260 continues to heat the aluminum-air fuel-cell 120 based on the prescribed temperature. After the control system 260 determines, in operation 507, an electrolyte status, i.e., that either all of the electrolyte, or a prescribed portion of the electrolyte has evaporated, the control system, in operation 509, diverts the waste heat from the expended aluminum-air fuel cell 120.

By evaporating the solvent (i.e., water) of the electrolyte 305 and exhausting the vapor from the aircraft 100, the mass of the electrolyte is removed from the aircraft 100. Evaporating may be preferred over draining the electrolyte 305, since the alkaline material of the electrolyte 305 may be toxic, and may need to be treated before being released from the aircraft 100.

Figure 6:
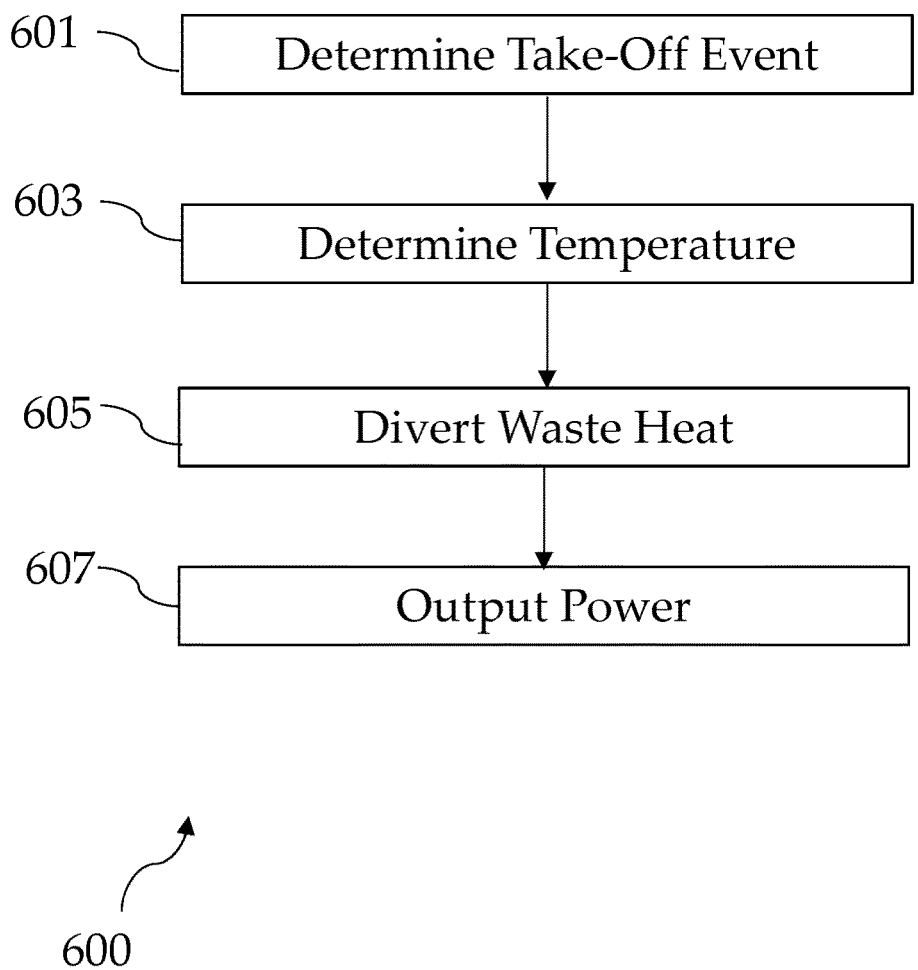
FIG. 6 shows a process for powering an aircraft during take-off in accordance with various embodiments.

FIG. 6 shows an exemplary process 600 for powering an aircraft during take-off in accordance with various embodiments. A number of variations or modifications to Process 600 are contemplated including, for example, the omission of one or more aspects of Process 600, the addition of further conditionals and operations, or the reorganization or separation of operations and conditionals into separate processes.

Process 600 begins at operation 601 where the control system 260 determines a take-off event is occurring. A take-off event may include the flight time period before the aircraft 100 reaches a cruising altitude, including taxiing to the runway and climbing to the cruising altitude. The control system 260 may determine a take-off event is occurring in response to a user input or in response to a measurement of output power from the aluminum-air fuel cell 120.

Before reaching a maximum power output point of the ascent, the aircraft 100 can heat the aluminum-air fuel cell 120 *r* to increase the power density of the aluminum-air fuel cell 120. In operation 603, the control system 260 determines a prescribed temperature for the aluminum-air fuel cell 120. The prescribed temperature may be the temperature that maximizes the power density of the aluminum-air fuel cell 120.

In operation 605, the control system 260 operates the diverter system 240 to transfer the waste heat from the waste heat source 105 to the aluminum-air fuel cell 120 outputting power during the take-off. The control system 260 allows the waste heat to heat the aluminum-air fuel cell 120 to the prescribed temperature. In some embodiments, the control system 260 begins to transfer the waste heat to the aluminum-air fuel-cell 120 before completing operation 603.

In operation 607, the heated aluminum-air fuel-cell 120 provides output power to the propulsors of the aircraft 100. The increased temperature of the aluminum-air fuel-cell 120 increases the maximum power output magnitude of the aluminum-air fuel cell 120.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" or "a portion" is used, the item can include a portion or the entire item unless specifically stated to the contrary. Unless stated explicitly to the contrary, the terms "or" and "and/or" in a list of two or more list items may connote an individual list item, or a combination of list items. Unless stated explicitly to the contrary, the transitional term "having" is open-ended terminology, bearing the same meaning as the transitional term "comprising."

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims. It shall nevertheless be understood that no limitation of the scope of the present disclosure is hereby created, and that the present disclosure includes and protects such alterations, modifications, and further applications of the exemplary embodiments as would occur to one skilled in the art with the benefit of the present disclosure.

What is claimed is:

1. An aircraft, comprising:
   at least one of an aircraft motor or an aircraft motor drive positioned outside of a fuselage of the aircraft;
   a metal-air fuel cell positioned inside the fuselage of the aircraft;
   a waste heat transfer system configured to thermally couple the metal-air fuel cell and the at least one of the aircraft motor or the aircraft motor drive; and
   a control system configured to operate the waste heat transfer system to selectively transfer waste heat from the at least one of the aircraft motor or the aircraft motor drive to the metal-air fuel cell.

2. The aircraft of claim 1, comprising an air supply system configured to pressurize an air supply for the metal-air fuel cell.

3. The aircraft of claim 1, comprising a plurality of metal-air fuel cells including the metal-air fuel cell,
   wherein the waste heat transfer system includes a diverter system configured to selectively transfer the waste heat from the at least one of the aircraft motor or the aircraft motor drive to a portion of the plurality of metal-air fuel cells.

4. The aircraft of claim 3,
   wherein the control system is configured to determine a power output status of a first metal-air fuel cell of the plurality of metal-air fuel cells, and to operate the diverter system to transfer the waste heat from the at least one of the aircraft motor or the aircraft motor drive to the first metal-air fuel cell in response to determining the power output status,
   wherein the waste heat is configured to evaporate an electrolyte of the first metal-air fuel cell.

5. The aircraft of claim 3, wherein the control system is configured to determine at least one of a power output status or a temperature of one of the plurality of metal-air fuel cells, and to operate the diverter system to transfer heat from the at least one of the aircraft motor or the aircraft motor drive to a first metal-air fuel cell in response to determining the at least one of the power output status or the temperature.

6. The aircraft of claim 1, wherein the control system is configured to determine a take-off event is occurring, wherein the control system is configured to operate a diverter system to transfer heat from the at least one of the aircraft motor or the aircraft motor drive to the metal-air fuel cell in response to determining the take-off event is occurring.

7. The aircraft of claim 1, wherein the waste heat transfer system includes a liquid-to-liquid heat exchanger, a liquid-to-air heat exchanger, and a diverter system, and wherein the metal-air fuel cell is an aluminum-air fuel cell.

8. A method for heating a metal-air fuel cell, comprising:
   operating an aircraft including,
      at least one of an aircraft motor or an aircraft motor drive positioned outside of a fuselage of the aircraft, and
      a metal-air fuel cell positioned inside the fuselage of the aircraft;
   outputting power from the metal-air fuel cell;
   generating thrust and waste heat using the at least one of the aircraft motor or the aircraft motor drive; and
   transferring the waste heat to the metal-air fuel cell.

9. The method of claim 8, comprising:
   pressurizing an air supply; and
   providing the pressurized air supply to the metal-air fuel cell.

10. The method of claim 8, comprising determining at least one of a power output status or a temperature,
    wherein transferring the waste heat to the metal-air fuel cell is in response to determining the at least one of the power output status or the temperature.

11. The method of claim 8, wherein the aircraft includes a second metal-air fuel cell.

12. The method of claim 11, comprising:
determining a power output status of the second metal-air fuel cell; and
transferring at least a portion of the waste heat to the second metal-air fuel cell.

13. The method of claim 8, comprising:
determining a power output status of the metal-air fuel cell; and
evaporating an electrolyte using the waste heat of the metal-air fuel cell.

14. The method of claim 8, wherein the metal-air fuel cell is an aluminum-air fuel cell.

15. An aircraft, comprising:
an aircraft motor;
an aircraft motor drive;
a first metal-air fuel cell configured to provide power to the aircraft motor drive;
a second metal-air fuel cell configured to provide power to the aircraft motor drive;
a waste heat transfer system configured to thermally couple the first and second metal-air fuel cells and at least one of the aircraft motor or the aircraft motor driver; and
a control system configured to operate the waste heat transfer system to selectively transfer waste heat to the first metal-air fuel cell and the second metal-air fuel cell.

16. The aircraft of claim 15, wherein the first and second metal-air fuel cells are aluminum-air fuel cells.

17. The aircraft of claim 15, wherein the waste heat transfer system includes a heater exchanger and a diverter system including a plurality of valves, wherein the control system is configured to operate the plurality of valves to selectively transfer the waste heat to the first metal-air fuel cell, and then to the second metal-air fuel cell.

18. The aircraft of claim 15, wherein the control system determines a power output status for the first metal-air fuel cell, and evaporates an electrolyte of the first metal-air fuel cell in response to the power output status.

19. The aircraft of claim 15, comprising an air supply system configured to pressurize an air supply for the first and second metal-air fuel cell.

20. The aircraft of claim 15, wherein the control system is configured to determine a take-off event is occurring, wherein the control system is configured to operate a diverter system of the waste heat transfer system to transfer heat from the at least one of the aircraft motor or the aircraft motor drive to the first metal-air fuel cell in response to determining the take-off event is occurring.

\* \* \* \* \*